US008823552B1

(12) United States Patent
Raphael et al.

(10) Patent No.: US 8,823,552 B1
(45) Date of Patent: Sep. 2, 2014

(54) VEHICLE WITH APPARATUS FOR GENERATING AND DISPLAYING A PREDEFINED LIGHT PATTERN

(71) Applicant: GM Global Technology Operations LLC, Detroit, MI (US)

(72) Inventors: Eric L. Raphael, Birmingham, MI (US); James N. Nickolaou, Clarkston, MI (US); Anna Saadatjoo, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 34 days.

(21) Appl. No.: 13/856,736

(22) Filed: Apr. 4, 2013

(51) Int. Cl.
*G08G 1/14* (2006.01)
*B60Q 1/26* (2006.01)
*B60Q 9/00* (2006.01)

(52) U.S. Cl.
CPC *B60Q 1/26* (2013.01); *B60Q 9/002* (2013.01); *B60Q 9/008* (2013.01)
USPC ......... 340/932.2; 340/933; 340/937; 340/435

(58) Field of Classification Search
CPC ........... B60Q 1/20; B60Q 9/002; B60Q 9/005
USPC ....................... 340/932.2, 937, 435
See application file for complete search history.

(56) References Cited

U.S. PATENT DOCUMENTS

2009/0279316 A1 * 11/2009 Hikmet et al. ................ 362/465

* cited by examiner

*Primary Examiner* — Tai T Nguyen
(74) *Attorney, Agent, or Firm* — Cantor Colburn LLP

(57) ABSTRACT

A combination includes a vehicle and an apparatus disposed in the vehicle for generating and displaying a predefined light pattern. The apparatus includes an actuator, a light source productive of collimated light disposed in operable communication with the actuator, and an optical beam shaper disposed in optical communication with the light source. The optical beam shaper is operable to transform collimated light from the light source into non-collimated light productive of a predefined light pattern on a projection surface.

20 Claims, 3 Drawing Sheets

US 8,823,552 B1

VEHICLE WITH APPARATUS FOR GENERATING AND DISPLAYING A PREDEFINED LIGHT PATTERN

FIELD OF THE INVENTION

The subject invention relates to a vehicle having an apparatus for generating and displaying a predefined light pattern, more particularly to a vehicle having an apparatus for generating and displaying a non-collimated light pattern from a collimated light source, and even more particularly to a vehicle having an apparatus for generating and displaying a predefined light pattern in response to a sensed event.

BACKGROUND

The generation and display of visible light on a windshield of a vehicle is available on vehicles equipped with an enhanced vision system such as a head-up display (HUD) system that provides an operator of a vehicle with information such as vehicle speed and/or navigation-related signals, or on vehicles equipped with a Reflected LED (light emitting diode) Alert Display (RLAD) that projects LED-source light onto the windshield of the vehicle if a vehicle sensor senses that the vehicle is too close to an object in front of it. While existing enhanced vision systems for vehicles may be suitable for their intended purpose, the associated complexity, size and weight of such systems may have a less than desired impact on the overall vehicle appearance, and still may not provide some desired functionality. Accordingly, it is desirable to provide an apparatus for use in a vehicle for generating and displaying a predefined light pattern that overcomes these disadvantages.

SUMMARY OF THE INVENTION

In an exemplary embodiment of the invention a combination includes a vehicle and an apparatus disposed in the vehicle for generating and displaying a predefined light pattern. The apparatus includes an actuator, a light source productive of collimated light disposed in operable communication with the actuator, and an optical beam shaper disposed in optical communication with the light source. The optical beam shaper is operable to transform collimated light from the light source into non-collimated light productive of a predefined light pattern on a projection surface.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
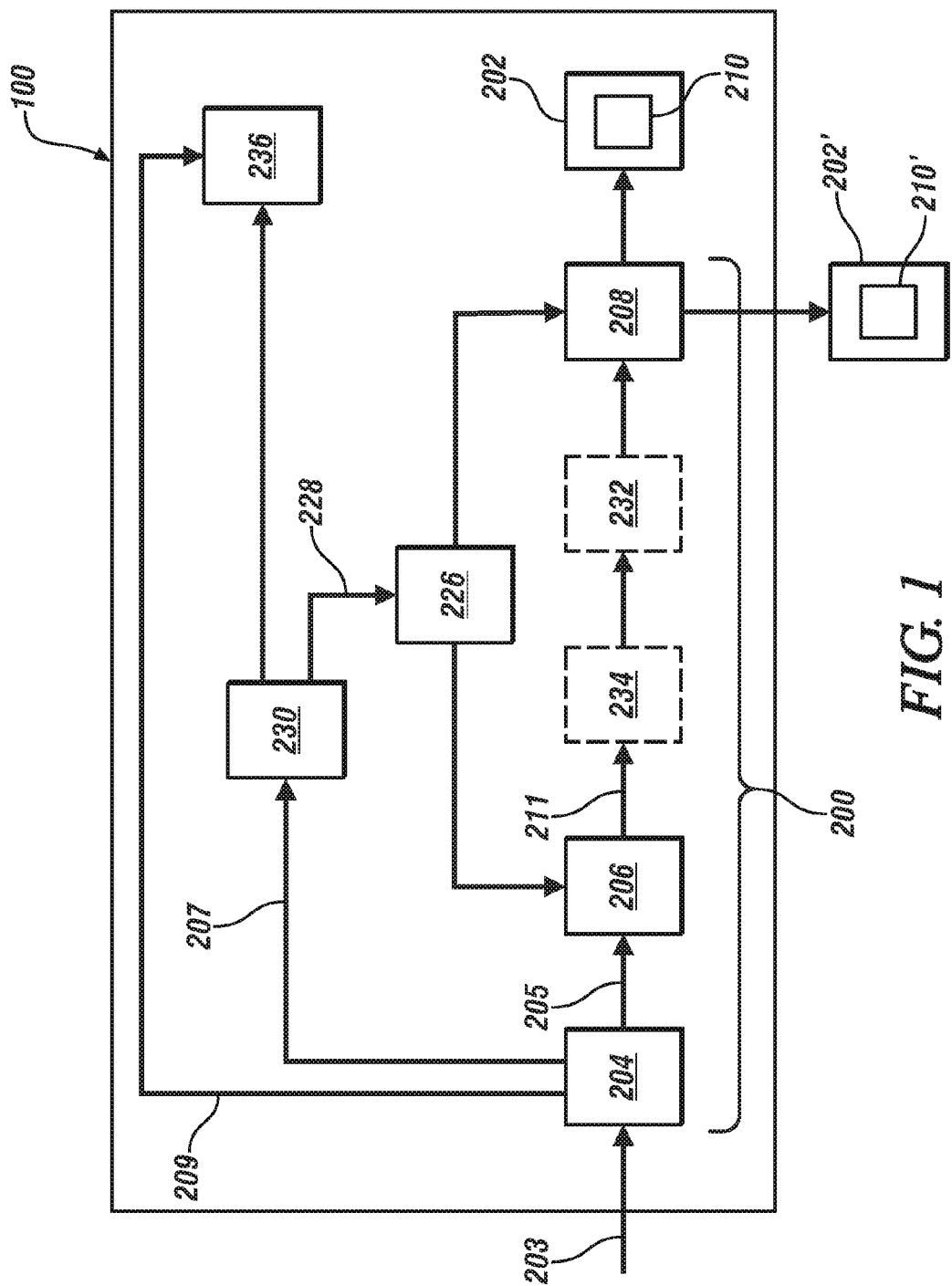
FIG. 1 depicts a block schematic diagram of a vehicle equipped with an apparatus configured to generate and display a predefined light pattern on a projection surface that is visible to an operator of the vehicle, in accordance with an embodiment of the invention.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention a vehicle is equipped with a beam shaper disposed in optical communication with a source of collimated light to project a predefined light pattern of non-collimated light onto a surface visible to an operator of the vehicle in response to an actuator being responsive to a vehicle-related condition that directly actuates or indirectly facilitates actuation of the light source.

FIG. 1 depicts in block diagram schematic form a vehicle 100 equipped with an apparatus 200 configured to generate and display a predefined light pattern on a projection surface 202, 202' that is visible to an operator of the vehicle 100. Projection surface 202 represents a surface that is part of the vehicle 100, while projection surface 202' represents a surface that is external to and not part of the vehicle 100, which will be discussed in more detail below.

In an embodiment, the apparatus 200 includes an actuator 204, a light source 206 productive of collimated light 211 disposed in operable communication with the actuator 204, and an optical beam shaper 208 disposed in optical communication with the light source 206, the optical beam shaper 208 being operable to transform collimated light from the light source 206 into non-collimated light productive of a predefined light pattern 210, 210' on a projection surface 202, 202'. For discussion purposes, reference will be made herein to a predefined light pattern 210 on a projection surface 202 when the prevailing discussion is directed to a projection surface that is part of the vehicle 100, reference will be made herein to a predefined light pattern 210' on a projection surface 202' when the prevailing discussion is directed to a projection surface that is external to and not part of the vehicle 100, and reference will be made herein to a predefined light pattern 210, 210' on a projection surface 202, 202' when the prevailing discussion could be applicable to either a projection surface that is part of the vehicle 100 or a projection surface that is external to and not part of the vehicle 100. In an embodiment, the light source 206 productive of collimated light is a laser. However, it will be appreciated that collimated light may be produced by other light sources, a combination of optical transmitting sources, or material to produce frequencies of optical sources, for example. All such light sources productive of collimated light are considered within the scope of the invention as disclosed herein.

While reference is made herein to a light source 206, it will be appreciated that more than one light source 206 may be employed to control the intensity of light, where the addition of light sources increases the intensity of light, and the removal of light sources reduces the intensity of light. Furthermore, the more than one light source 206 may include a first plurality of light sources 206 having a first light frequency, a second plurality of light sources 206 having a second light frequency, and a third plurality of light sources 206 having a third light frequency, thereby enabling the production of a predefined light pattern 210 in different colors as well as different intensities.

In an embodiment, the predefined light pattern 210, 210' may be a non-homogeneous light pattern, an outline of a geometric shape, a logo, one or more alphanumeric characters, an image of any kind, a shape of any kind, or any combination of the foregoing light patterns, and may be stationary, non-stationary or animated, which will be discussed further below. Furthermore, the predefined light pattern 210, 210' may be two-dimensional (2D), three-dimensional (3D), two-dimensional and movable in time (psuedo-3D), or three-dimensional and movable in time (4D), as will be appreciated from the description below.

Figure 2:
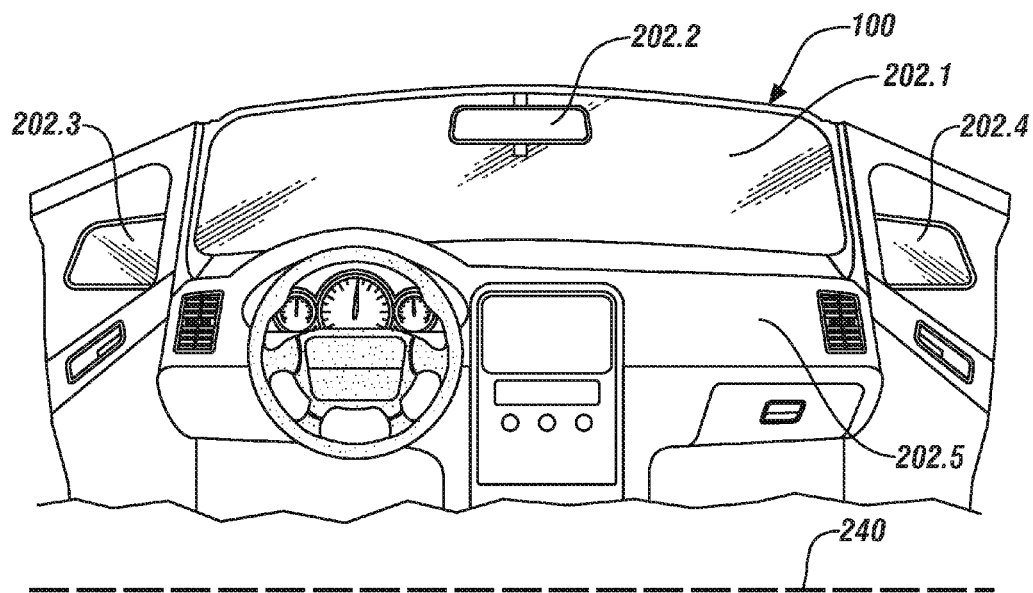
FIG. 2 depicts a portion of the vehicle of FIG. 1 illustrating various projection surfaces, in accordance with an embodiment of the invention.

In an embodiment, and with reference to FIG. 2, the projection surface 202 may be an interior surface of a windshield 202.1 of the vehicle 100, a rear view minor 202.2 of the vehicle 100, a left side view mirror 202.3 of the vehicle 100, a right side view mirror 202.4 of the vehicle 100, or an interior surface 202.5 of the vehicle 100. In an embodiment, the interior surface 202.5 may be a dashboard or a rear window of the vehicle 100, but could be any other surface of the vehicle 100 useful for a purpose disclosed herein. The projection surface 202, 202' is disposed relative to the light source 206 and optical beam shaper 208 such that light originating from the light source 206 is reflected off of the projection surface 202, 202' and is visible to an operator of the vehicle 100.

In an embodiment, the actuator 204 is a collision alert sensor (herein referred to by reference numeral 204), which may include a radar apparatus, a camera apparatus, a laser apparatus, a proximity sensor, or any combination thereof. In general, the collision alert sensor 204 is responsive to a sensed situation 203 and is productive of a signal 205 representative of an impending or potential collision or impact when the vehicle 100 is closer to an object than a predefined distance. In response to the collision alert sensor 204 being productive of the aforementioned signal 205 being representative of an impending collision of the vehicle 100 with an object, the light source 206 is activated, i.e., switched on. The collision alert sensor 204 may be a forward collision alert sensor, a side blind zone sensor, or a park assist sensor, which will be discussed separately below. In general, however, the optical beam shaper 208 has a beam shaping structure, discussed in more detail below, operable in response to activation of the light source 206 and disposed in optical communication with the light source 206 to produce the predefined light pattern 210 in an area visible to an operator of the vehicle 100 on a portion of the windshield 202.1 when the collision alert sensor 204 is a forward collision alert sensor, on the rear view minor 202.2 when the collision alert sensor 204 is a park assist sensor, on the left side view minor 202.3 or right side view mirror 202.4 when the collision alert sensor 204 is a side blind zone sensor, or on any other surface of the vehicle suitable for a purpose disclosed herein.

Figure 3:
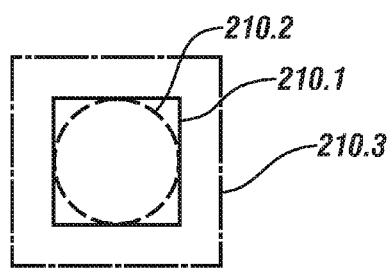
FIG. 3 depicts a plurality of predefined light patterns, in accordance with an embodiment of the invention.

As discussed above, the predefined light pattern 210 may take on different forms, but it may also alternate between different forms, and it may intermittently, simultaneously or consecutively display the same form or alternate forms at different time intervals. For example, and with reference now to FIG. 3, a first light pattern 210.1 may be a simple outline of a square, a second light pattern 210.2 may be a simple outline of a circle, and third light pattern 210.3 may be another simple outline of a square that is larger than the first light pattern (smaller square in comparison) 210.1. In an embodiment, the light source 206 and optical beam shaper 208 combination is operable to produce the first light pattern 210.1 by itself, either fixed, animated or flashing. In another embodiment, the light source 206 and optical beam shaper 208 combination is operable to produce the first light pattern 210.1 and the second light pattern 210.2, together, separately, alternating in time, fixed, animated, or flashing. And in yet another embodiment, the light source 206 and optical beam shaper 208 combination is operable to produce the first and/or second light pattern 210.1, 210.2 and the third light pattern 210.3, together, separately, alternating in time, fixed, animated, or flashing. For example, in one embodiment the light patter 210 may alternate between a first shape (a square for example) 210.1 and a second shape (a circle for example) 210.2, and in another embodiment the light pattern 210 may alternate between a large square (or other shape) 210.3 and a small square (or other shape) 210.1, to capture the vehicle operator's attention to an impending collision situation. In another embodiment the light pattern 210 may vary in time from a large pattern to a small pattern, or vice versa, with any number of intermediate sized patterns being displayed in between in a succession of images from the first size to the second size. By selecting a particular combination of light patterns to project for a particular collision alert scenario, the collision alert system can be appropriately tailored to the prevailing circumstances. While embodiments disclosed herein refer to a particular geometric shape for the predefined light pattern 210, illustrated in FIG. 3 as predefined light patterns 210.1, 210.2, 210.3, it will be appreciated that such reference is for discussion purpose only and that the scope of the invention is not limited to only the particular shape mentioned. Alternative shapes and sizes to those discussed herein are contemplated and considered to be within the scope of the disclosed invention. While embodiments disclosed herein refer to only three predefined light patterns 210.1, 210.2, 210.3, it will be appreciated that such reference is for discussion purposes only and that the scope of the invention is not limited to only three light patterns, but encompasses any number of light patterns suitable for a purpose disclosed herein.

In an embodiment, the collision alert sensor 204 is productive of a first signal representative of an object being at a first distance away from the vehicle 100, and a second signal representative of the same object being at a second distance (closer than the first distance for example) away from the vehicle 100. In response to the occurrence of the first signal, the light source 206 and optical beam shaper 208 combination may be operable to produce the first light pattern 210.1 (a relatively small square/shape for example), which would be indicative of the object being at a relatively far distance away from the vehicle 100, and in response to the occurrence of the second signal, the light source 206 and optical beam shaper 208 combination may be operable to produce the third light pattern 210.3 (a relatively large square/shape for example), which would be indicative of the object being at a relatively close distance to the vehicle 100. By changing the size and/or shape of the projected light pattern 210 depending on the prevailing circumstances, the vehicle operator can be better informed as to the situation at hand.

In an embodiment where the collision alert sensor 204 is a forward collision alert sensor, and in response to the forward collision alert sensor 204 being productive of a first signal representative of an impending collision of the vehicle 100 with an object ahead of the vehicle 100 at a first distance, or in combination with a second signal representative of an impending collision of the vehicle 100 with the object ahead of the vehicle 100 at a second distance, the light source 206 and optical beam shaper 208 combination is operable to produce a predefined light pattern 210 on a portion of the windshield 202.1 visible to an operator of the vehicle 100, where the predefined light pattern 210 may be any one of the aforementioned first, second and third light patterns 210.1, 210.2, 210.3 in any of the aforementioned manners of display, including where one of the light patterns correlates with the first distance, and another of the light patterns is different from the one light pattern and correlates with the second distance.

In another embodiment where the collision alert sensor 204 is a forward collision alert sensor, a predefined light pattern 210 may be projected onto the rear window or other rear surface of the vehicle 100, or a section of the ground at the rear of the vehicle 100, with a warning to a trailing vehicle that a large braking event is likely to occur.

In an embodiment where the collision alert sensor 204 is a park alert sensor, and in response to the park alert alert sensor 204 being productive of a first signal representative of an object being at a first distance from the vehicle 100, or in combination with a second signal being representative of an object being at a second distance from the vehicle, the light source 206 and optical beam shaper 208 combination is operable to produce a predefined light pattern 210 on a portion of the rear view minor 202.2 visible to an operator of the vehicle 100, where the predefined light pattern 210 may be any one of the aforementioned first, second and third light patterns 210.1, 210.2, 210.3 in any of the aforementioned manners of display, including where one of the light patterns correlates with the first distance, and another of the light patterns is different from the one light pattern and correlates with the second distance.

In another embodiment where the collision alert sensor 204 is a park alert sensor, a predefined light pattern 210 may be projected onto the ground outside of the vehicle 100 to illuminate an expected trajectory of the vehicle 100 during a parallel parking maneuver.

In an embodiment where the collision alert sensor 204 is a side blind zone sensor, and in response to the side blind zone alert sensor 204 being productive of a first signal representative of an object being at a first distance from the vehicle 100, or in combination with a second signal being representative of an object being at a second distance from the vehicle, the light source 206 and optical beam shaper 208 combination is operable to produce a predefined light pattern 210 on a portion of the left or right side view mirror 202.3, 202.4 visible to an operator of the vehicle 100, where the predefined light pattern 210 may be any one of the aforementioned first, second and third light patterns 210.1, 210.2, 210.3 in any of the aforementioned manners of display, including where one of the light patterns correlates with the first distance, and another of the light patterns is different from the one light pattern and correlates with the second distance. In an embodiment, the predefined light pattern 210 is displayed on a portion of the left side view mirror 202.3 when the object being sensed by the side blind zone sensor 204 is located on the driver's side of the vehicle 100, and is displayed on a portion of the right side view mirror 202.4 when the object being sensed by the side blind zone sensor 204 is located on the passenger's side of the vehicle 100.

Figure 4:
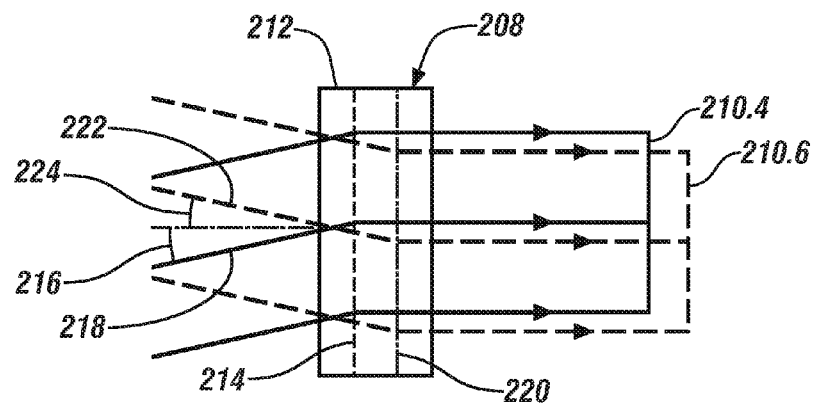
FIG. 4. depicts a side view of an optical beam shaper for use in accordance with an embodiment of the invention.

FIG. 4 depicts a side view of an exemplary optical beam shaper 208 having an optically transmissive body 212, a first beam shaping layer 214 disposed within or on a first outer surface of the body 212, and a second beam shaping layer 220 disposed within or on a second outer surface of the body 212. The first beam shaping layer 214 has a structure that is operable in response to activation of the light source 206 to produce a first of the predefined light pattern 210.4 when the angle of incidence of light 218 from the light source 206 to the first beam shaping layer 214 is at a first angle of incidence 216. The second beam shaping layer 220 has a structure that is operable in response to activation of the light source 206 to produce a second of the predefined light pattern 210.6 different from the first predefined light pattern 210.4 when the angle of incidence of light 222 from the light source 206 to the second beam shaping layer 220 is at a second angle of incidence 224 different from the first angle of incidence 216. It is contemplated that an optical diffuser available from RPC Photonics, Inc., or a holographic optical diffuser available from Physical Optics Corp., would be suitable for providing the optical beam shaper 208 with appropriately designed beam shaping layers 214, 220 suitable for a purpose disclosed herein.

In an embodiment, it is contemplated that a defined structural feature associated with the windshield 202.1 may be utilized to create the predefined light pattern 210, or the first and second predefined light patterns 210.4, 210.6, by taking advantage of known refractive and reflective indices associated with the defined structural feature. Example structural features associated with the windshield 202.1 for a purpose disclosed herein include but are not limited to: the type, amount, orientation and/or spacing of fibers embedded within a safety glass version of the windshield 202.1; the type, amount, orientation and/or spacing of nanoparticles embedded within the windshield 202.1; or, the type amount, orientation and/or spacing of a reflective layer embedded within or disposed upon an outer surface of the windshield 202.1.

As will be appreciated from FIG. 4, the first and second angle of incidence 216, 224 may be achieved via motion of the light source 206 relative to a stationary optical beam shaper 208, motion of the optical beam shaper 208 relative to a stationary light source 206, or relative motion of the light source 206 in combination with relative motion of the optical beam shaper 208. As such, the light source 206, the optical beam shaper 208, or both the light source 206 and the optical beam shaper 208, may be movable via a driver 226 to produce the first and the second of the predefined light patterns 210.4, 210.6. With reference to FIG. 4 in combination with FIG. 1, an embodiment includes as external control signal 228 from a control system 230 of the vehicle 100 being operative to provide a control command to the driver 226 to articulate the light source 206 and/or the optical beam shaper 208 to facilitate production of the first and/or second angle of incidence 216, 224 to achieve the relative motion between the light source 206 and the optical beam shaper 208. In an embodiment, the control system 230 is in signal communication with the actuator 204 to receive data and/or a signal 207 indicative of the actuator 204 being active. In an embodiment, a control algorithm executed by the control system 230 is operative to create the first and second predefined light patterns 210.4, 210.6 in response to actuation of actuator 204 and in accordance with other embodiments disclosed herein.

Furthermore, by utilizing a driver 226 to change the orientation of a light source 206 and/or optical beam shaper 208, coupled with one of the aforementioned defined structural features of the windshield 202.1, it is contemplated that the first and second predefined light patterns 210.4, 210.6 illustrated in FIG. 4 may be created without the need to use an optical beam shaper 208 having one or more of the aforementioned beam shaping layers 214, 220. Alternatively, it is also contemplated that additional predefined light patterns 210, 210.4, 210.6 may be created by using a combination of an optical beam shaper 208 with beam shaping layers 214, 220, along with a windshield 202.1 having one or more of the aforementioned defined structural features, particularly if combined with a driver 226 that can actuate one or both of the light source 206 and optical beam shaper 208 as discussed above. It is further contemplated that colors and intensities of the predefined light patterns 210, 210.4, 210.6 can be controlled by adding or removing light sources 206, as discussed previously.

Figure 5:
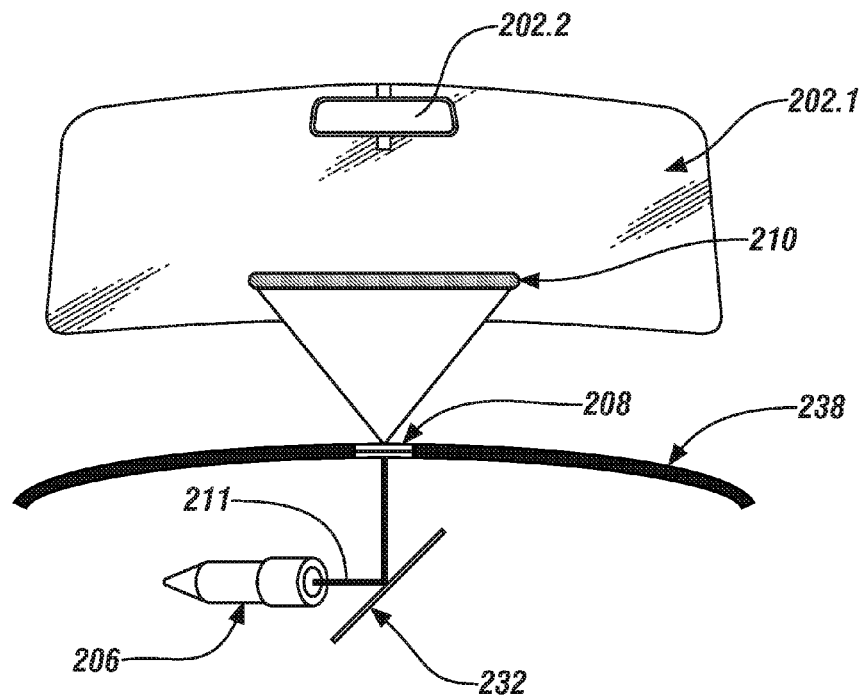
FIG. 5 depicts a schematic diagram of a portion of the vehicle of FIG. 1, in accordance with an embodiment of the invention.

With reference now back to FIG. 1, an embodiment of the invention includes a reflective surface 232, such as a mirror for example, disposed between the light source 206 and the optical beam shaper 208, such that light from the light source 206 is reflected off of the reflective surface 232 and directed to the optical beam shaper 208 for projection onto the projection surface 202, 202'. In another embodiment, a digital light processor (DLP) 234 is disposed between the light source 206 and the optical beam shaper 208, such that light from the light source 206 is directed by the DLP 234 to the optical beam shaper 208 for projection onto the projection surface 202, 202'. In an embodiment the DLP 234 can be utilized to redirect the light from the light source 206 to have different angles of incidence with respect to an optical beam shaper 208 having different beam shaping layers 214, 220 to provide the aforementioned predefined light patterns 210.4, 210.6. By utilizing a reflective surface 232 and/or a DLP 234, the light source 206 can be conveniently located within the vehicle 100, such as behind an instrument panel of the vehicle 100 for example, best seen with reference to FIG. 5. The reflective surface 232 or DLP 234 could also be located behind the instrument panel 238, and the optical beam shaper 208 formed integrally with the instrument panel 238, such that light from the light source 206 would originate from behind the instrument panel 238, be redirected via the reflective surface 232 or DLP 234, and be transformed to non-collimated light as it passes through the optical beam shaper 208, and out through instrument panel 238, for display onto the desired projection surface 202, 202', such as the windshield, the frit (black out area around the perimeter of the windshield), or surfaces near the windshield 202.1, for example.

Figure 6:
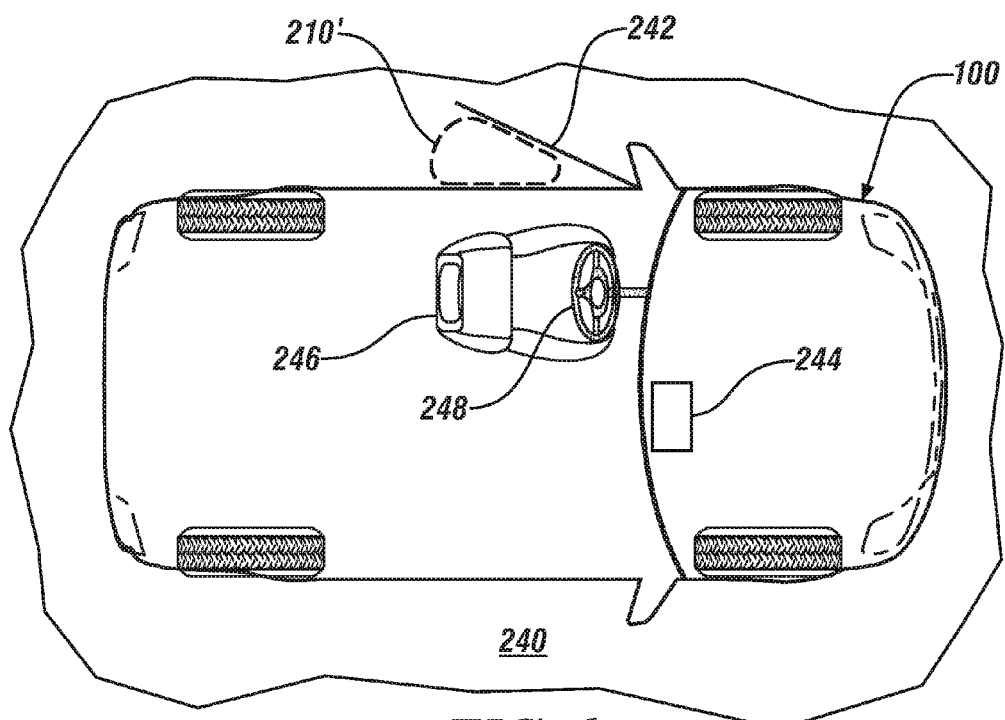
FIG. 6 depicts a schematic diagram of the vehicle of FIG. 1 illustrating various components of the vehicle operable in accordance with an embodiment of the invention.

From foregoing discussions directed to projection surface 202' representing a surface that is external to and not part of the vehicle 100, and with reference now to FIG. 6 in combination with FIGS. 1 and 2, it will be appreciated that a predefined light pattern 210' may be projected onto the ground 240 upon which the vehicle 100 is disposed at the time. In this configuration, the actuator 204 could be a door switch that is responsive to a door 242 of the vehicle 100 being open, for example. The predefined light pattern 210' could be a non-collimated light that illuminates the ground 240 near the open door 242 to help an operator of the vehicle 100 see whether there is a puddle of water that the vehicle 100 is parked in, or could be a particular image that illuminates the ground 240 outside of the vehicle 100 with a manufacturer's logo, an indicator, or a warning icon of any type, for example. Whether the predefined light pattern 210' is a puddle light or a manufacturer's logo, the light source 206 and optical beam shaper 208 combination is operable to produce the puddle light or manufacturer's logo on the projection surface 202' in response to the door 242 of the vehicle 100 being open.

In an embodiment, and with reference back to FIG. 1, an auxiliary device 236 may be utilized in combination with the predefined light pattern 210 to attract the attention of the operator of the vehicle 100, or other individuals inside or outside the vehicle 100, such as during a forward collision alert for example. In an embodiment, the auxiliary device 236 could be used to alert bikers, for example, as they approach an impending door opening. The auxiliary device 236 may be an audio device, a haptic device, or a combination of an audio and a haptic device, disposed in operable communication with the actuator 204 and in sensory communication with an operator of the vehicle 100, such that actuation of the actuator 204 facilitates actuation of the auxiliary device 236 to provide further sensory communication with the operator in combination with the predefined light pattern 210 being projected onto the projection surface 202.

In an embodiment where the auxiliary device 236 is an audio device, and with reference to FIGS. 1, 2 and 6, the audio device (also herein referred to by reference numeral 236) may be an audio system 244 of the vehicle 100, such as a radio or multi-media system for example, and the sensory communication with the operator of the vehicle 100 may occur by the control system 230 interrupting a normal play mode of the audio device 236 in response to actuation of the actuator 204 to provide the aforementioned audio sensory communication, such as a relatively load and/or rapid audible signal in a single tone or beeping for example, with the operator of the vehicle 100.

In an embodiment where the auxiliary device 236 is a haptic device (also herein referred to by reference numeral 236), which in an embodiment may be a vibratory device operably coupled to a driver's seat 246 and/or a steering wheel 248 of the vehicle 100 for example, the sensory communication with the operator of the vehicle 100 may occur by the actuator 204 providing a signal 209 to the haptic device 236 concurrent with the signal 205 from the actuator 204 being indicative of the actuator 204 being active, to provide the aforementioned haptic sensory communication, such as steady or intermittent vibration of the driver's seat 246 and/or steering wheel 248 for example, with the operator of the vehicle 100.

While embodiments have been described herein with reference to a light source 206 and an optical beam shaper 208, it will be appreciated that multiple light sources 206 and/or multiple optical beam shapers 208 may be employed together in a single vehicle 100, and that one or more of the aforementioned reflective surface 232 and/or DLP 234 may be utilized to direct or redirect light from a respective light source 206 to a respective optical beam shaper 208 to produce a multitude of predefined light patterns 210, 210' on respective projection surfaces 202, 202', in accordance with the disclosure provided herein.

While embodiments have been described herein with reference to an apparatus 200 productive of a predefined light pattern 210, 210', with or without activation of an auxiliary device 236, for use in a collision alert system in a vehicle 100, it will be appreciated that the same apparatus 200 and auxiliary device 236 may be used for other purposes, such as informational messaging or entertainment, for example. In an embodiment, the apparatus 200 and auxiliary device 236 may be employed to generate audio in addition to a predefined light pattern 210, 210' that ranges from factory-loaded messages to personalized/programmable messages aimed toward customized presentations. For example, safety alerts may be presented both visually and audibly on an interior or exterior surface of the vehicle 100 or the exterior ground, or entertainment may be provided both visually and audibly in the form of music with a repetitive display of logos or icons on an interior or exterior surface of the vehicle 100 or the exterior ground. The utility of apparatus 200 and auxiliary device 236 for such purposes is contemplated and considered within the scope of the invention disclosed herein.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A combination, comprising:
   a vehicle; and
   an apparatus disposed in the vehicle for generating and displaying a predefined light pattern, the apparatus comprising:
   an actuator;
   a light source productive of collimated light disposed in operable communication with the actuator; and
   an optical beam shaper disposed in optical communication with the light source, the optical beam shaper being operable to transform collimated light from the light source into non-collimated light productive of a predefined light pattern on a projection surface.

2. The combination of claim 1, wherein the light source comprises a laser.

3. The combination of claim 1, wherein the predefined light pattern comprises a non-homogeneous light pattern, an outline of a geometric shape, a logo, an alphanumeric character, or any combination of the foregoing light patterns.

4. The combination of claim 1, wherein the projection surface comprises at least one of a windshield of the vehicle, a rear view minor of the vehicle, a side view minor of the vehicle, an interior surface of the vehicle, or a surface exterior to the vehicle.

5. The combination of claim 4, wherein:
   the actuator comprises a collision alert sensor;
   in response to the collision alert sensor being productive of a signal representative of an impending collision of the vehicle with an object, the actuator is operable to activate the light source; and
   the optical beam shaper comprises a beam shaping structure operable in response to activation of the light source to produce the predefined light pattern on a portion of the at least one of a windshield, a rear view minor and a side view mirror of the vehicle, in an area visible to an operator of the vehicle.

6. The combination of claim 5, wherein the predefined light pattern comprises an outline of a geometric shape.

7. The combination of claim 5, wherein the collision alert sensor comprises at least one of a forward collision alert sensor, a side blind zone sensor, or a park assist sensor.

8. The combination of claim 7, wherein the collision alert sensor comprises a forward collision alert sensor, and further wherein:
   in response to the forward collision alert sensor being productive of a signal representative of an impending collision of the vehicle with an object ahead of the vehicle, the light source and optical beam shaper combination is operable to produce the predefined light pattern on a portion of the windshield visible to an operator of the vehicle, the predefined light pattern being: a first light pattern; a first and a second light pattern separated in time; a first and a second light pattern having different shapes or sizes; or, a combination of the foregoing light patterns.

9. The combination of claim 8, wherein the signal is a first signal representative of an impending collision of the vehicle with an object at a first distance ahead of the vehicle, and further wherein:
   in response to the forward collision alert sensor being productive of a second signal representative of an impending collision of the vehicle with the object being at a second distance ahead of the vehicle different from the first distance, the second light pattern differs from the first light pattern in a manner that correlates the first light pattern with the first distance, and the second light pattern with the second distance.

10. The combination of claim 7, wherein the collision alert sensor comprises a forward collision alert sensor, and further wherein:
    in response to the forward collision alert sensor being productive of a signal representative of an impending collision of the vehicle with an object ahead of the vehicle, the light source and optical beam shaper combination is operable to produce the predefined light pattern on a rear portion of the vehicle visible to an operator of a trailing vehicle, the predefined light pattern being: a first light pattern; a first and a second light pattern separated in time; a first and a second light pattern having different shapes or sizes; or, a combination of the foregoing light patterns.

11. The combination of claim 7, wherein the collision alert sensor is a park assist sensor, and further wherein:
    in response to the park assist sensor being productive of a signal representative of an object at a distance from the vehicle, the light source and optical beam shaper combination is operable to display the predefined light pattern on a portion of the rear view mirror visible to an operator of the vehicle, the predefined light pattern being: a first light pattern; a first and a second light pattern separated in time; a first and a second light pattern having different shapes or sizes; or, a combination of the foregoing light patterns.

12. The combination of claim 11, wherein the signal is a first signal representative of an object at a first distance from the vehicle, and further wherein:
    in response to the park assist sensor being productive of a second signal representative of the object being at a second distance from the vehicle different from the first distance, the second light pattern differs from the first light pattern in a manner that correlates the first light pattern with the first distance, and the second light pattern with the second distance.

13. The combination of claim 7, wherein the collision alert sensor is a side blind zone sensor, and further wherein:
    in response to the side blind zone sensor being productive of a signal representative of an object in a side blind zone region of the vehicle and at a distance from the vehicle, the light source and optical beam shaper combination is operable to display predefined light pattern on a portion of the side view minor visible to an operator of the vehicle, the predefined light pattern being: a first light pattern; a first and a second light pattern separated in time; a first and a second light pattern having different shapes or sizes; or, a combination of the foregoing light patterns.

14. The combination of claim 13, wherein the signal is a first signal representative of an object in a side blind zone region of the vehicle and at a first distance from the vehicle, and further wherein:
    in response to the side blind zone sensor being productive of a second signal representative of the object in the side blind zone region of the vehicle being at a second distance from the vehicle different from the first distance, the second light pattern differs from the first light pattern in a manner that correlates the first light pattern with the first distance, and the second light pattern with the second distance.

15. The combination of claim 4, wherein the projection surface is the surface exterior to the vehicle that comprises a surface upon which the vehicle is disposed, wherein the actuator is responsive to a door of the vehicle being open, wherein the predefined light pattern comprises a logo, and wherein the light source and optical beam shaper combination is operable to produce the logo light pattern on the projection surface in response to the door of the vehicle being open.

16. The combination of claim 1, wherein the optical beam shaper comprises:
- a first beam shaping layer operable in response to activation of the light source to produce a first of the predefined light pattern when the angle of incidence of light from the light source to the first beam shaping layer is at a first angle of incidence; and
- a second beam shaping layer operable in response to activation of the light source to produce a second of the predefined light pattern different from the first predefined light pattern when the angle of incidence of light from the light source to the second beam shaping layer is at a second angle of incidence different from the first angle of incidence.

17. The combination of claim 16, wherein:
the light source, the optical beam shaper, or both the light source and the optical beam shaper, are movable to produce the first and the second of the predefined light patterns.

18. The combination of claim 1, further comprising:
a reflective surface disposed between the light source and the optical beam shaper, such that light from the light source is reflected off of the reflective surface and directed to the optical beam shaper.

19. The combination of claim 1, further comprising:
a digital light processor disposed between the light source and the optical beam shaper, such that light from the light source is directed by the digital light processor to the optical beam shaper.

20. The combination of claim 1, further comprising:
an auxiliary device comprising an audio device, a haptic device, or a combination of an audio and a haptic device, the auxiliary device being disposed in operable communication with the actuator and in sensory communication with an operator of the vehicle, such that actuation of the actuator facilitates actuation of the auxiliary device to provide further sensory communication with the operator in combination with the predefined light pattern being projected onto the projection surface.

* * * * *